United States Patent [19]
Lawson

[11] Patent Number: 5,448,861
[45] Date of Patent: Sep. 12, 1995

[54] METHOD AND APPARATUS FOR SECURING PARTS OF A BUILDING TO EACH OTHER AND TO A FOUNDATION

[76] Inventor: Donald L. Lawson, 4202 Del Bello, Manvel, Tex. 77578

[21] Appl. No.: 277,555

[22] Filed: Jul. 19, 1994

[51] Int. Cl.⁶ .......................... E04B 1/98; E04H 9/02; E04C 5/12; E04C 5/08
[52] U.S. Cl. ...................... 52/92.2; 52/93.1; 52/223.13; 52/223.14; 52/291; 52/293.3; 52/295; 52/741.1; 52/741.3
[58] Field of Search ............ 52/23, 223.13, 291, 52/295, 698, 712, 293.3, 92.1, 92.2, 93.1, 741.1, 741.3, 745.06, DIG. 11, 747, 223.1, 223.14, 704; 24/68 CT; 403/205, 206, 208, 465.1

[56] References Cited

U.S. PATENT DOCUMENTS

| | | | |
|---|---|---|---|
| 269,018 | 12/1882 | Crowell et al. | 52/23 |
| 670,286 | 3/1901 | Lortz | 52/291 |
| 874,283 | 12/1907 | Axx | 52/291 |
| 1,599,335 | 9/1926 | Levens | 52/92.1 |
| 3,309,822 | 3/1967 | Dunkin | 52/23 |
| 4,069,627 | 1/1978 | Pegg | 52/291 |
| 4,321,776 | 3/1982 | Delight | 52/295 X |
| 4,888,926 | 12/1989 | Lutz | 52/291 |
| 5,311,708 | 5/1994 | Frye | 52/92.2 X |

Primary Examiner—Carl D. Friedman
Assistant Examiner—Robert J. Canfield
Attorney, Agent, or Firm—John R. Casperson

[57] ABSTRACT

A technique is disclosed for providing a building with good wind resistance by the use of a reinforcing structure. Specific reinforcing structure is also disclosed. The technique involves affixing a tethering device over a portion of the roof frame and securing the ends of the tethering device to the building foundation.

17 Claims, 2 Drawing Sheets

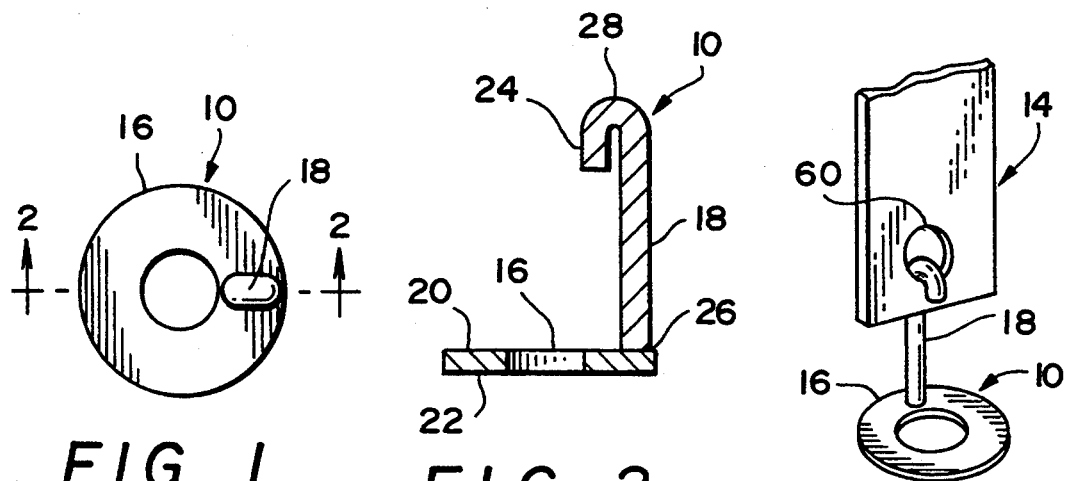
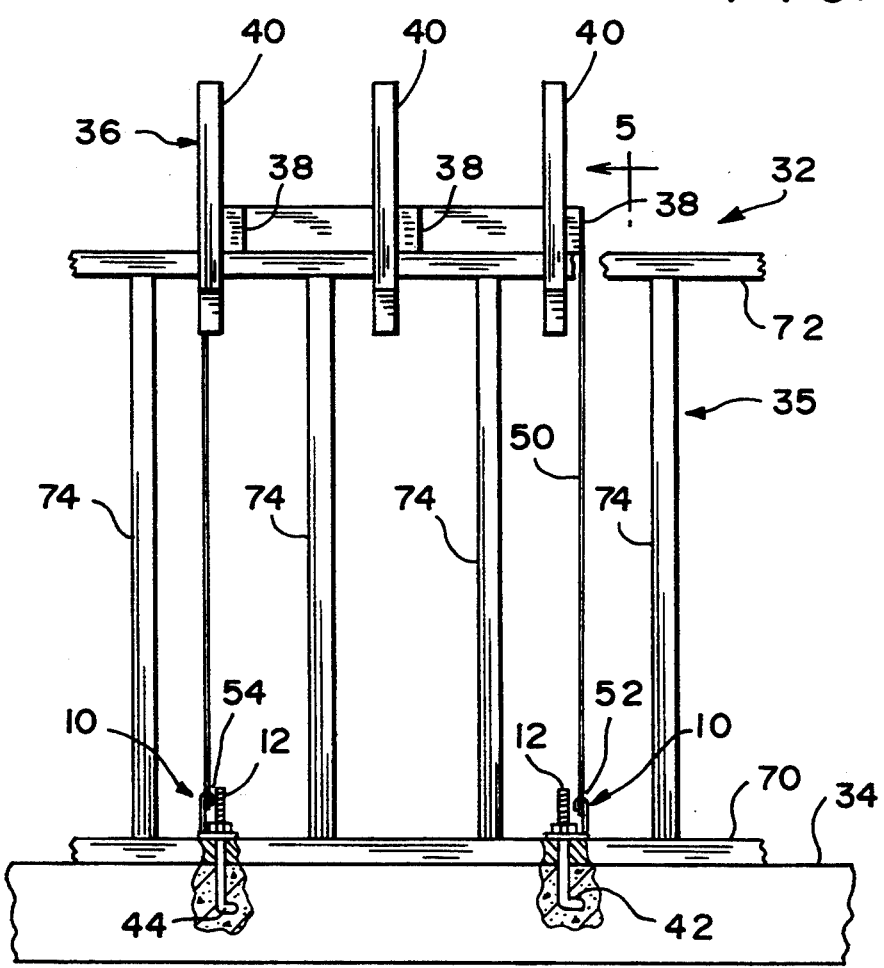

METHOD AND APPARATUS FOR SECURING PARTS OF A BUILDING TO EACH OTHER AND TO A FOUNDATION

BACKGROUND OF THE INVENTION

This invention relates to building construction. In one aspect, this invention relates to the construction of buildings having resistance to wind. In another aspect, this invention relates to hardware useful for building construction.

It is important that buildings be constructed with good wind resistance when they are located in areas in which it is probable that they will be exposed to high winds during the life of the building. This is especially true in coastal areas along the Gulf and Atlantic coasts, because of the risk of hurricanes.

Dwelling houses typically have a wooden frame and are difficult to construct with adequate wind resistance. The roof is especially vulnerable to wind damage, because it is located high above the ground, where wind velocity is generally greater than near the ground. Dwelling homes constructed on piers above the ground are also vulnerable, because they are high above the ground and because they are often situated near open areas, such as water or marshes, both tending to lead to exposure to high velocity wind.

The technique most commonly used to reinforce such structures comprises attaching the wooden frame members of such buildings together using "hurricane clips", which are metal templates having protruding nail structures. Hundreds of these clips must be used. They are expensive and time consuming to install. A building technique to reinforce the building against high winds which avoids the use of hurricane clips would be extremely desirable.

OBJECTS OF THE INVENTION

It is an object of this invention to provide a reinforced building frame.

It is another object of this invention to provide hardware for reinforcing a building frame.

It is another object of this invention to provide a method for producing a reinforced building frame.

It is another object of this invention to fulfill the above objects with good economy and without the use of hurricane clips.

SUMMARY OF THE INVENTION

In a first embodiment of the invention, there is provided a connector for connecting a bolt to a tethering device. The tethering device can be a chain, a cable or a strap, for example. The connector comprises a washer portion and a connector portion. The washer portion has a generally annular first face and an opposite, generally annular second face. An imaginary longitudinal axis extends normally to the first face and the second face. The connector portion is fixedly mounted to the first face and extends from the first face in a direction generally parallel to the longitudinal axis of the washer portion. Desirably, the connector has a hook or an eye spaced apart from the washer portion to attach to the tethering device. The connector enables the tightening of the tether to a desired degree of tension to better retain an object in a desired location when used in combination with a bolt. The connector is highly useful in connection with other aspects of the invention to secure a roof frame and a wall frame to a building foundation.

In another embodiment of the invention, there is provided a building support structure. The structure comprises a foundation secured to the earth. A wall frame is positioned on the foundation. A roof frame is positioned on the wall frame. A first anchor bolt is anchored in the foundation beneath a portion of the wall frame. A second anchor bolt is anchored in the foundation beneath a portion of the wall frame at a position spaced apart from the first anchor bolt. A tie down structure having a first end connected to the first anchor bolt and a second end connected to the second anchor bolt extends through the wall frame from the first anchor bolt, across a portion of the roof frame to a position above the second anchor bolt, and through the wall frame to the second anchor bolt. The support structure should be highly wind resistant, and thus of beneficial use in hurricane-prone areas. It is less labor intensive to produce than building structures relying on hurricane clips for wind resistance as well as less expensive, since it avoids the use of hundreds of hurricane clips. The building can be finished out using conventional building techniques.

In another embodiment of the invention, there is provided a method for securing a building roof frame against high winds. The roof frame so secured in accordance with this embodiment of the invention is supported by a wall frame which is supported by a foundation such as a slab resting on the earth. A tie down structure having a first end and a second end is positioned to extend upwardly from the foundation, across an upper surface of a portion of the roof frame, and downwardly to the foundation. The tie down structure is connected to the foundation at the first end and the second end. The method should prove to be highly beneficial in hurricane areas. It provides a more durable structure than hurricane clips when used in conjunction with ordinary nails, since both the roof and wall structures are connected directly to the slab by the tie down structure.

BRIEF DESCRIPTION OF THE DRAWINGS

FIG. 1 is a top plan view of a connector according to certain aspects of one embodiment of the invention.

FIG. 2 is a cross sectional view of the connector shown in FIG. 1 when viewed along lines 2—2.

FIG. 3 is a pictorial representation showing certain aspects of the deployment of the connector.

FIG. 4 is a pictorial representation, partly schematic, showing a portion of a building frame according to certain aspects of one embodiment of the invention.

DETAILED DESCRIPTION OF THE PREFERRED EMBODIMENTS

Figure 5:
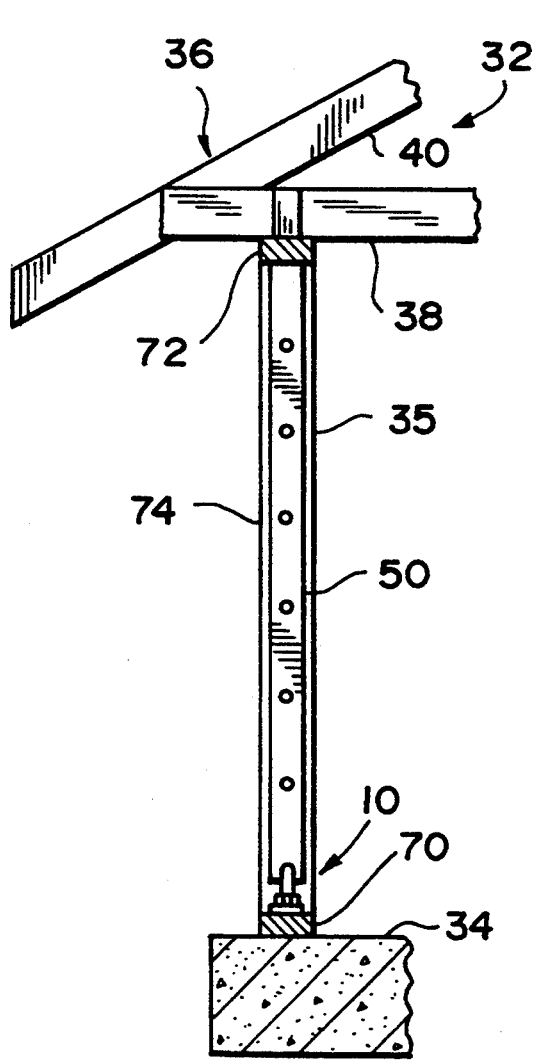
FIG. 5 is a cross sectional view of the building frame shown in FIG. 4 when viewed along lines 5—5.

In a first embodiment of the invention, there is provided a connector 10 for connecting a bolt 12 to a tethering device 14. The tethering device 14 can be a chain, a cable or a strap, for example. A strap is illustrated. The connector 10 comprises a washer portion 16 and a connector portion 18. The washer portion 16 has a generally annular first face 20 and an opposite, generally annular second face 22. An imaginary longitudinal axis extends normally to the first face and the second face. The connector portion 18 is fixed mounted to the first face 20 in known fashion, for example by welding and extends from the first face in a direction generally parallel to the longitudinal axis of the washer portion. Preferably, the connector portion 18 has a hook or an eye spaced apart from the washer portion to attach to the tethering device 14. A hook 24 is preferred and is illustrated. When a hook is used, the connector portion 18 comprises a J shaped shaft having a head end 26 and a hook end 28. The head end 28 of the shaft is connected to the first face 20 of the washer portion 16. The connector enables the tightening of the tethering device to a desired degree of tension to better retain an object in a desired location when used in combination with a bolt.

In another embodiment of the invention, there is provided a building support structure 32. An alternative support structure 132 is shown in FIG. 6. Like call-outs are used on FIGS. 5 and 6 where appropriate. Each structure 32 and 132 comprises a foundation 34 secured to the earth. Preferably, the foundation 34 comprises a concrete slab, although with slight modification, it could be formed from timbers mounted on pilings sunk into the earth. A wall frame 35 is positioned on the foundation. A roof frame 36 is positioned on the wall frame. In the embodiment of the invention shown in FIG. 5, a ceiling beam 38 is supported by the wall frame. In the embodiment shown in FIG. 6, both a ceiling beam 38 and a roof beam 40 are supported on the wall frame.

With reference to FIG. 4, the first anchor bolt 42 is anchored in the foundation beneath a portion of the wall frame. A second anchor bolt 44 is anchored in the foundation beneath a portion of the wall frame at a position spaced apart from the first anchor bolt. The anchor bolts and their positioning in the foundation are well known. A tie down structure 50 has a first end 52 connected to the first anchor bolt 42 and a second end 54 connected to the second anchor bolt 44. The tie down structure extends through the wall frame 35 from the first anchor bolt 42, across an upper surface of a portion of the roof frame 36 to a position above the second anchor bolt 44 and through the wall frame 35 to the second anchor bolt 44.

Figure 6:
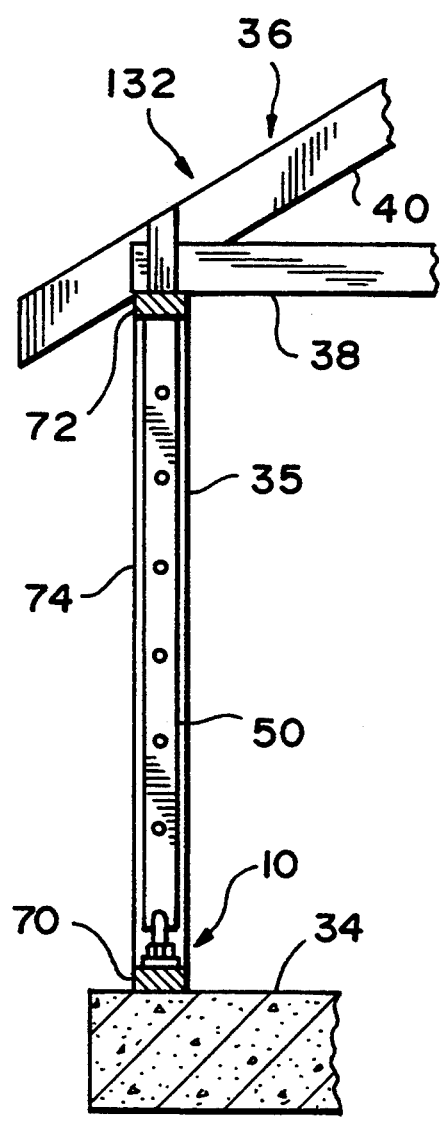
FIG. 6 is a cross sectional view from the same perspective as FIG. 5 showing another embodiment of the invention.

In the embodiment of the invention shown in FIG. 5, the roof frame comprises a plurality of ceiling beams and the tie down structure extends across an upper surface of at least one of the ceiling beams. In the embodiment of the invention shown in FIG. 6, the roof frame comprises a plurality of roof beams and the tie down structure extends across an upper surface of at least one of the roof beams.

The tie down structure is preferably under tension from the anchor bolts so that the roof frame is pulled tightly against the wall frame and the wall frame is pulled tightly against the foundation. In the most preferred embodiment of the invention, the strap is provided with a plurality of apertures such as aperture 60 in FIG. 3 to facilitate tensioning. One end of the strap can be connected to a tie down bolt. A weight can be applied to the other end of the strap to pretension the strap. The strap can be hooked to the other anchor bolt through the selection of the appropriate aperture and the tie down structure can then have the proper tension applied with a nut. The tie down structure can be trimmed if desired.

In the embodiments of the invention shown in FIGS. 4, 5 and 6, the wall frame comprises a footer 70 adjacent to the slab 34 and a header 72 spaced above the footer 70. A plurality of vertically positioned wall studs 74 connect the footer 70 and the header 72. The tie down structure 50 extends upwardly from the first anchor bolt 42 between a first pair of wall studs 74, over an upper surface of a portion of the roof frame 32 and downwardly between a second pair of wall studs 74 to the second anchor bolt 44.

Preferably, a first tie down connector is positioned on the first anchor bolt 42 and a second tie down connector is positioned on the second anchor bolt 44. The first end 52 of the tie down structure is connected to the first anchor bolt 42 by the first tie down connector and the second end 54 of the tie down structure is connected to the second anchor bolt 44 by the second tie down connector. The tie down connectors can be as previously described. In such case, the tie down structure is connected to the connector portion of the tie down connecter and the washer portion of the tie down connector is secured to the anchor bolt by a nut.

In another embodiment of the invention, there is provided a method for securing a building roof frame against high winds. The roof frame so secured in accordance with this embodiment of the invention is supported by a wall frame which is supported by a foundation. In one embodiment, the foundation is formed from a slab resting on the earth. A first anchor bolt is positioned in the slab beneath a portion of the wall frame. A second anchor bolt is positioned in the slab beneath a portion of the wall frame at a position spaced apart from the first anchor bolt. A tie down structure having a first end and a second end is positioned to extend upwardly from the first anchor bolt, across an upper surface of a portion of the roof frame to a position above the second anchor bolt, and downwardly to the second anchor bolt. The first end of the tie down structure is attached to the first anchor bolt and the second end of the tie down structure is attached to the second anchor bolt.

In a preferred embodiment of the invention, a first tie down connector is positioned on the first anchor bolt and a second tie down connector is positioned on the second anchor bolt. The first end of the tie down structure is attached to the first tie down connector and the second end of the tie down structure is attached to the second tie down connector. A first nut is positioned on the first anchor bolt over the washer portion of the first tie down connector. A second nut is positioned on the second anchor bolt over the washer portion of the second tie down connector. The tie down structure extends over a portion of the roof frame as described before. The nuts are tightened sufficiently to apply tension to the tie down structure so that the roof frame is pulled tightly against the wall frame and the wall frame is pulled tightly against the foundation.

While certain preferred embodiments of the invention have been shown and described, the invention is not to be construed as being so limited, except to the extent that such limitations are found in the claims.

What is claimed is

1. A building support structure comprising
   a foundation;
   a wall frame positioned on the foundation;
   a roof frame positioned on the wall frame;
   a first anchor bolt anchored in the foundation beneath a portion of the wall frame;
   a second anchor bolt anchored in the foundation beneath a portion of the wall frame at a position spaced apart from the first anchor bolt;

a tie down structure having a first end connected to the first anchor bolt and a second end connected to the second anchor bolt, the tie down structure extending through the wall frame from the first anchor bolt, across an upper surface of a portion of the roof frame to a position above the second anchor bolt, and through the wall frame to the second anchor bolt.

2. A building support structure as in claim 1 wherein the tie down structure is under tension from the anchor bolts so that the roof frame is pulled tightly against the wall frame and the wall frame is pulled tightly against the foundation.

3. A building support structure as in claim 2 wherein the roof frame comprises a plurality of ceiling beams and the tie down structure extends across an upper surface of at least one of the ceiling beams.

4. A building support structure as in claim 2 wherein the roof frame comprises a plurality of roof beams and the tie down structure extends across an upper surface of at least one of the roof beams.

5. A building support structure as in claim 2 wherein the tie down structure comprises a metal strap and the foundation comprises a concrete slab.

6. A building support structure as in claim 5 wherein the wall frame comprises a footer adjacent to the slab, a header spaced above the footer, and a plurality of vertically positioned wall studs connecting the footer and the header; wherein the tie down structure extends upwardly from the first anchor bolt between a first pair of wall studs, over an upper surface of a portion of the roof frame and downwardly between a second pair of wall studs to the second anchor bolt.

7. A building support structure as in claim 6 further comprising a first tie down connector on the first anchor bolt and a second tie down connector on the second anchor bolt, wherein the first end of the tie down structure is connected to the first anchor bolt by the first tie down connector and the second end of the tie down structure is connected to the second anchor bolt by the second tie down connector.

8. A building support structure as in claim 7 wherein each tie down connector comprises
a washer portion and a connector portion, wherein the washer portion has a generally annular first face and an opposite, generally annular second face and a longitudinal axis extending normally to the first face and the second face, and the connector portion is fixed to the first face and extends there from in a direction generally parallel to the longitudinal axis of the washer portion, wherein the tie down structure is connected to the connector portion of each tie down connector and the washer portion of the tie down connector is secured to the anchor bolt by a nut.

9. A method for securing a building roof frame against high winds, the roof frame being supported by a wall frame, the wall frame being supported by a foundation secured to the earth, the method comprising:
positioning a tie down structure having a first end and a second end to extend through the wall frame from the foundation, across an upper surface of portion of the roof frame and back through the wall frame to the foundation.

10. A method as in claim 9 further comprising
positioning a first anchor bolt in the foundation beneath a portion of the wall frame;
positioning a second anchor bolt in the foundation beneath a portion of the wall frame at a position spaced apart from the first anchor bolt;
attaching the first end of the tie down structure to the first anchor bolt, and attaching the second end of the tie down structure to the second anchor bolt, wherein the tie down structure extends across the roof frame from a position over the first anchor bolt to a position over the second anchor bolt.

11. A method as in claim 10 further comprising
positioning a first tie down connector on the first anchor bolt and a second tie down connector on the second anchor bolt;
attaching the first end of the tie down structure to the first tie down connector and the second end of the tie down structure to the second tie down connector.

12. A method as in claim 11 wherein the foundation comprises a concrete slab footed in the earth and each tie down connector has a washer portion which fits over an anchor bolt and a connector portion which is attached the tie down structure, the method further comprising
positioning a first nut on the first anchor bolt over the washer portion of the first tie down connector;
positioning a second nut on the second anchor bolt over the washer portion of the second tie down connector; and
tightening the first nut and the second nut sufficiently to apply tension to the tie down structure.

13. A method as in claim 12 wherein the tie down structure comprises a metal strap.

14. A method as in claim 13 wherein the wall frame comprises a footer adjacent to the slab, a header spaced above the footer, and a plurality of vertically positioned wall studs connecting the footer and the header, and the roof frame comprises a plurality of ceiling beams connected to the header; wherein the tie down structure extends upwardly from the first ancor bolt between a first pair of studs, over an upper surface of at least one of the ceiling beams, and downwardly between a second pair of studs to the second anchor bolt.

15. A method as in claim 14 wherein the tie down structure extends upwardly through the header, across an upper surface of at least one of the ceiling beams, and downwardly through the header.

16. A method as in claim 13 wherein the wall frame comprises a footer adjacent to the slab, a header spaced above the footer, and a plurality of vertically positioned wall studs connecting the footer and the header, and the roof frame comprises a plurality of roof beams connected to the header; wherein the tie down structure extends upwardly from the first anchor bolt between a first pair of wall studs, over an upper surface of at leat one of the roof beams, and downwardly between a second pair of studs to the second anchor bolt.

17. A method as in claim 16 wherein the tie down structure extends upwardly through the header, across an upper surface of at least one of the roof beams, and downwardly through the header.

* * * * *